United States Patent
Suplee, III et al.

(10) Patent No.: US 9,916,514 B2
(45) Date of Patent: Mar. 13, 2018

(54) TEXT RECOGNITION DRIVEN FUNCTIONALITY

(75) Inventors: Richard Howard Suplee, III, Bainbridge Island, WA (US); Geoffrey Scott Heller, Seattle, WA (US); Daniel Bibireata, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 464 days.

(21) Appl. No.: 13/493,714

(22) Filed: Jun. 11, 2012

(65) Prior Publication Data

US 2013/0329023 A1    Dec. 12, 2013

(51) Int. Cl.
- *H04N 1/00* (2006.01)
- *G06K 9/20* (2006.01)
- *H04N 1/32* (2006.01)

(52) U.S. Cl.
CPC ....... *G06K 9/2081* (2013.01); *H04N 1/00331* (2013.01); *H04N 1/00968* (2013.01); *H04N 1/32048* (2013.01); *G06K 2209/01* (2013.01); *H04N 2201/0084* (2013.01)

(58) Field of Classification Search
CPC .......................... G06K 2209/01; G06K 9/6878
See application file for complete search history.

(56) References Cited

U.S. PATENT DOCUMENTS

| | | | |
|---|---|---|---|
| 4,975,948 A * | 12/1990 | Andresen | H04M 1/2755 379/355.08 |
| 7,310,605 B2 | 12/2007 | Janakiraman et al. | |
| 7,734,729 B2 * | 6/2010 | Du | G06Q 10/087 705/26.1 |
| 8,175,380 B2 | 5/2012 | Kim et al. | |
| 8,526,743 B1 * | 9/2013 | Campbell | G06K 9/6202 382/181 |
| 8,620,774 B1 | 12/2013 | Li et al. | |

(Continued)

FOREIGN PATENT DOCUMENTS

| | | |
|---|---|---|
| CN | 101431559 | 5/2009 |
| CN | 101639760 | 2/2010 |

(Continued)

OTHER PUBLICATIONS

Extended European Search Report for Patent Application No. EP13804969.7, dated Jul. 7, 2016, 7 pages.

(Continued)

*Primary Examiner* — Jay Patel
*Assistant Examiner* — Shadan E Haghani
(74) *Attorney, Agent, or Firm* — Polsinelli LLP

(57) ABSTRACT

Various approaches for providing textual information to an application, system, or service are disclosed. In particular, various embodiments enable a user to capture an image with a camera of a portable computing device. The computing device is capable of taking the image and processing it to recognize, identify, and/or isolate the text in order to forward the text to an application or function. The application or function can then utilize the text to perform an action in substantially real-time. The text may include an email, phone number, URL, an address, and the like and the application or function may be dialing the phone number, navigating to the URL, opening an address book to save contact information, displaying a map to show the address, and so on.

20 Claims, 6 Drawing Sheets

(56) References Cited

U.S. PATENT DOCUMENTS

| | | | |
|---|---|---|---|
| 9,369,657 B2 | 6/2016 | Lee | |
| 2001/0032070 A1 | 10/2001 | Teicher | |
| 2003/0105589 A1* | 6/2003 | Liu | G06F 17/30017 702/1 |
| 2004/0046804 A1* | 3/2004 | Chang | G06F 3/0482 715/810 |
| 2004/0141644 A1 | 7/2004 | Kurosawa | |
| 2005/0021470 A1* | 1/2005 | Martin | G06F 17/30749 705/51 |
| 2005/0050165 A1* | 3/2005 | Hamynen | G06F 17/30887 709/218 |
| 2005/0052558 A1 | 3/2005 | Yamazaki et al. | |
| 2005/0073136 A1 | 4/2005 | Larsson et al. | |
| 2005/0091651 A1* | 4/2005 | Curtis | G06F 8/65 717/168 |
| 2006/0017692 A1* | 1/2006 | Wehrenberg | G06F 1/1616 345/156 |
| 2006/0041828 A1* | 2/2006 | King | H04N 1/00244 715/205 |
| 2006/0195797 A1* | 8/2006 | Yeung | H04N 1/00411 715/811 |
| 2007/0266392 A1 | 11/2007 | Thoelke | |
| 2008/0175507 A1 | 7/2008 | Lookingbill et al. | |
| 2008/0307436 A1 | 12/2008 | Hamilton | |
| 2008/0317346 A1* | 12/2008 | Taub | G06K 9/00671 382/182 |
| 2009/0327915 A1* | 12/2009 | Holdaway | G06F 9/4443 715/745 |
| 2010/0125816 A1 | 5/2010 | Bezos | |
| 2011/0081948 A1* | 4/2011 | Shirai | G06T 11/60 455/556.2 |
| 2012/0163520 A1 | 6/2012 | Liu et al. | |
| 2012/0163664 A1 | 6/2012 | Zhu | |
| 2012/0242473 A1* | 9/2012 | Choi | B60W 50/14 340/441 |
| 2012/0307086 A1 | 12/2012 | Jefremov et al. | |
| 2013/0044241 A1 | 2/2013 | Zhou | |
| 2013/0086102 A1 | 4/2013 | Addala et al. | |
| 2013/0212099 A1* | 8/2013 | Dellinger | G06F 17/3064 707/731 |
| 2014/0040653 A1 | 2/2014 | Etkin et al. | |
| 2014/0118305 A1 | 5/2014 | Jang et al. | |
| 2015/0364109 A1 | 12/2015 | Jain et al. | |

FOREIGN PATENT DOCUMENTS

| | | |
|---|---|---|
| CN | 102291548 | 12/2011 |
| JP | H05-28203 | 2/1993 |
| JP | 2004-038367 | 2/2004 |
| JP | 2004-140555 | 5/2004 |
| JP | 2005-084951 | 3/2005 |
| WO | 2013/188463 | 12/2013 |

OTHER PUBLICATIONS

Translated second office action and supplementary search report for Chinese Patent Application No. 201380038146.9, dated May 2, 2017, 5 pages.

Huang, Jim, "Android IPC Mechanism," Mar. 19, 2012, 82 pages, http://0xlab.org.

PCT International Search Report and Written Opinion dated Dec. 20, 2013, for International Application No. PCT/US2013/045265 filed Jun. 11, 2013, 13 pages.

PCT International Preliminary Report on Patentability dated Dec. 16, 2014, for International Application No. PCT/US2013/045265 filed Jun. 11, 2013, 6 pages.

Translated first office action and search report for Chinese Patent Application No. 201380038146.9, dated Aug. 29, 2016, 19 pages.

English translation of the third office action and supplementary search report for Chinese Patent Application No. 201380038146.9, dated Nov. 9, 2017, 13 pages.

* cited by examiner

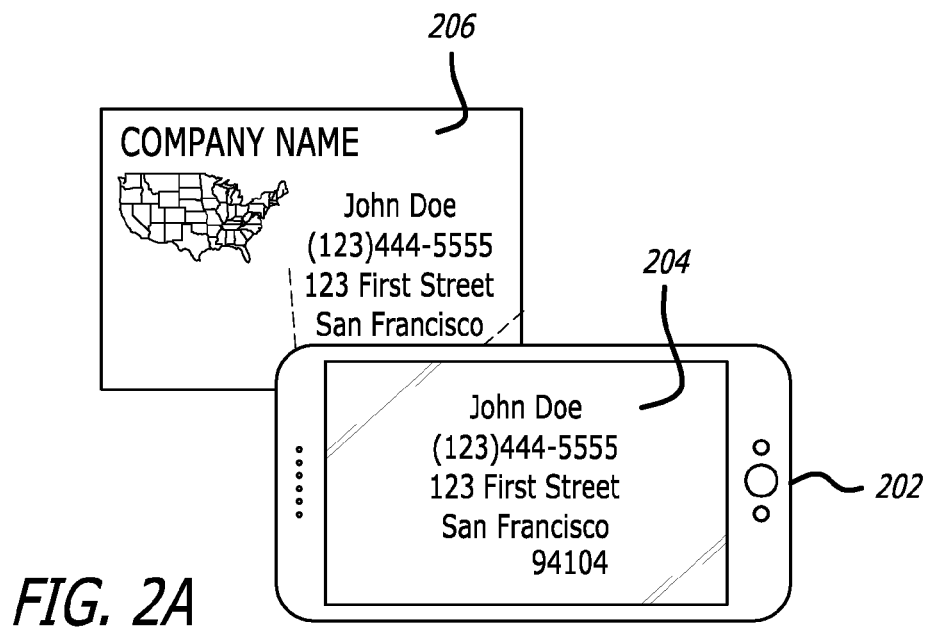
FIG. 2A
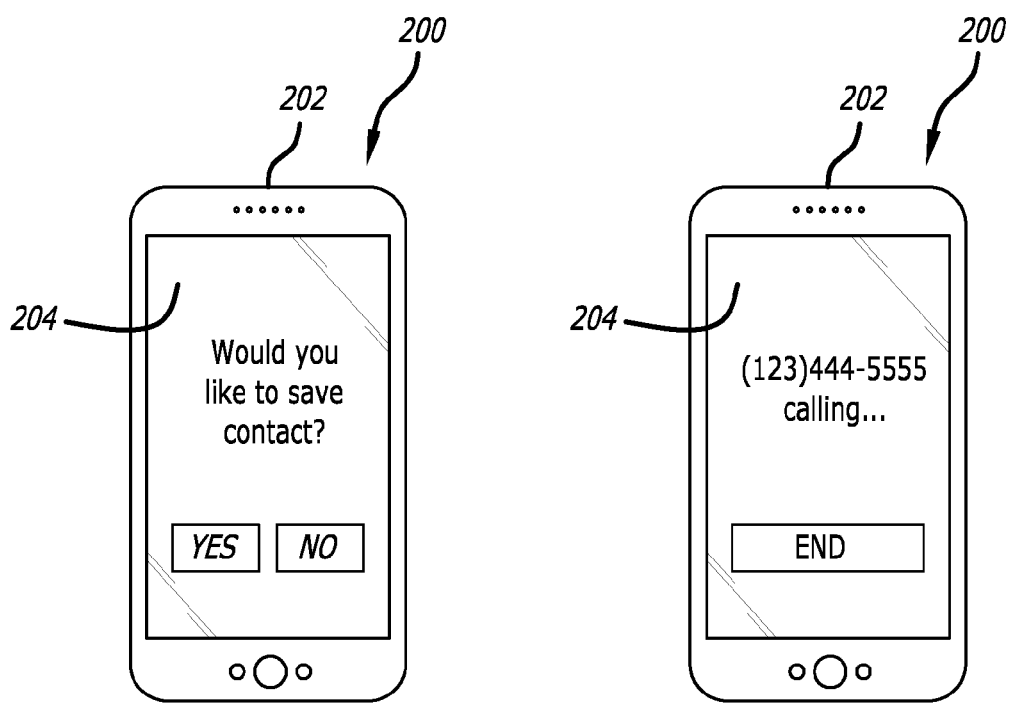
FIG. 2B
FIG. 2C

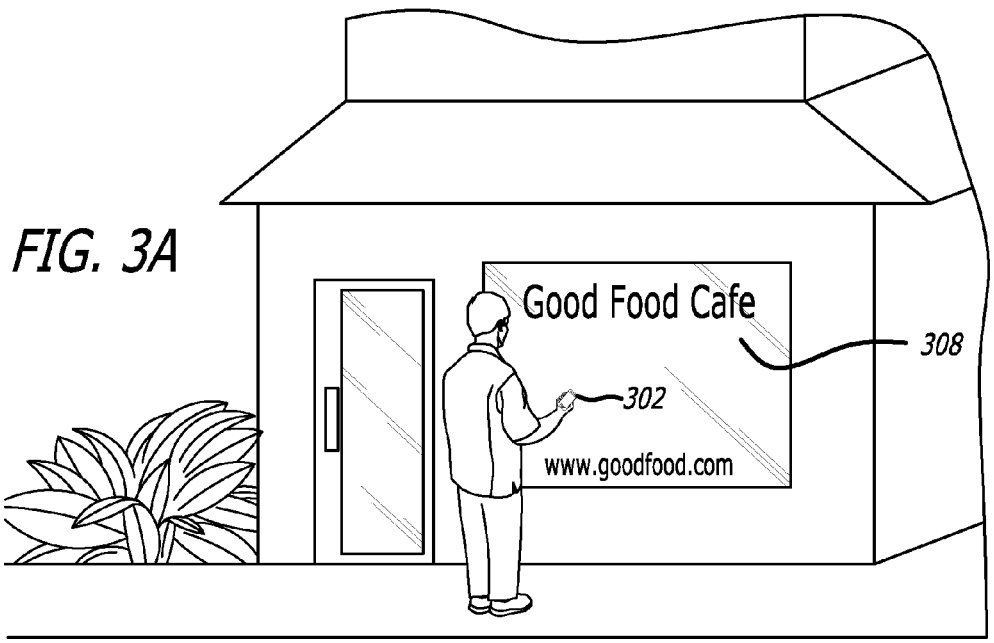
FIG. 3A
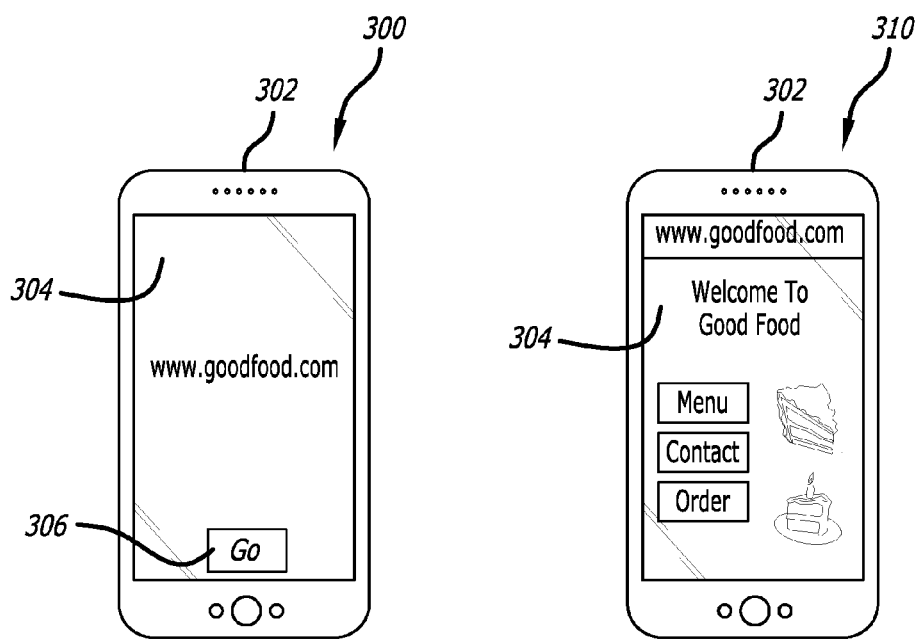
FIG. 3B
FIG. 3C

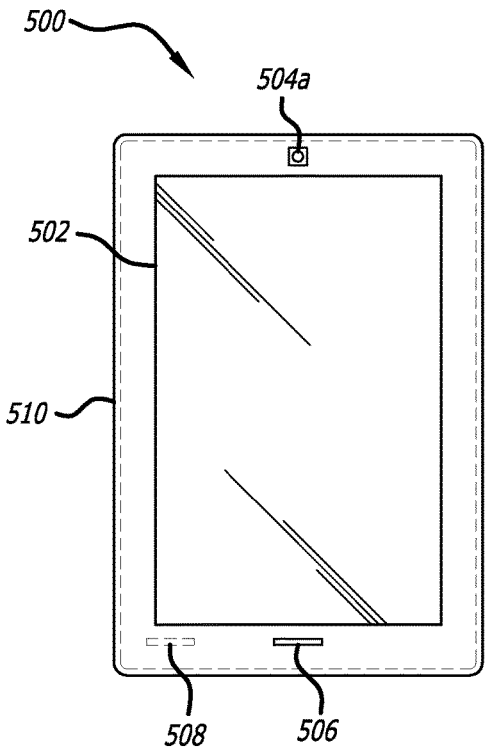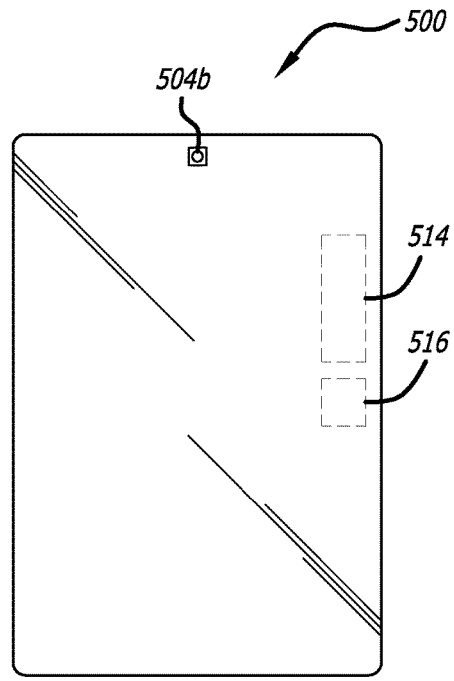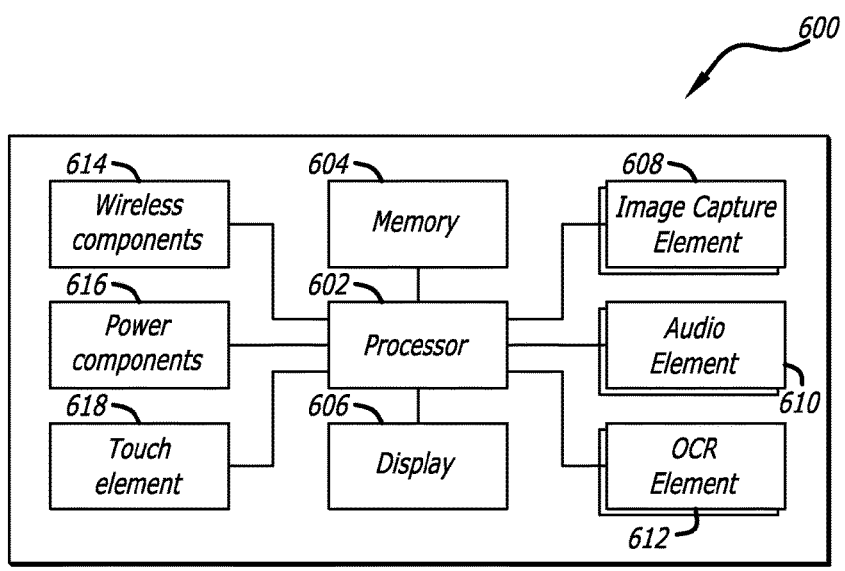

TEXT RECOGNITION DRIVEN FUNCTIONALITY

BACKGROUND

As people are increasingly utilizing a variety of computing devices, including portable devices such as tablet computers and smart phones, it can be advantageous to adapt the ways in which people interact with these devices. Users are accustomed to manually inputting phone numbers to make a phone call, manually typing an email address to send an email, manually typing a web address into a web browser to view a web page, and the like. These tasks are often tedious and time consuming. Various methods to save users time have been offered on various devices such as assigning a phone number to a favorites list and bookmarking a Web address. As technology evolves and as the features and services offered on portable computing devices evolve and expand, the ways shortcuts and other time saving methods are provided is changing.

BRIEF DESCRIPTION OF THE DRAWINGS

Various embodiments in accordance with the present disclosure will be described with reference to the drawings, in which:

FIGS. 2A, 2B, and 2C illustrate an example implementation wherein a user holding a portable computing device provides a phone number to a phone application, in accordance with one embodiment;

FIGS. 3A, 3B and 3C illustrate an example implementation wherein a user holding a portable computing device provides text to a browser, in accordance with one embodiment;

FIGS. 5A and 5B illustrate front and back view examples of a computing device that can be utilized in accordance with various embodiments;

FIG. 6 illustrates a component level example of a computing device that can be utilized in accordance with various embodiments.

DETAILED DESCRIPTION

Systems and methods in accordance with various embodiments of the present disclosure may overcome one or more of the aforementioned and other deficiencies experienced in conventional approaches for providing textual information to an application, system, or service. In particular, various embodiments enable a portable computing device to perform tasks such as to obtain image information that includes text, locate the text in the image, identify a type or pattern of the text (e.g. an email, phone number, URL etc.), determine a function or application (e.g. calling a number, opening an internet browser, etc.) associated with the text, and/or perform the function or application associated with the text. At least some of these tasks can be performed using at least one resource available across a network as well.

In one embodiment, a user can point a camera at an object that includes text to capture an image thereof. The camera can be integrated with a portable computing device which is capable of taking the image and processing it to recognize, identify, and/or isolate the text in order to send it to an application or function. The application or function can then utilize the text to perform an action in substantially real-time. For example, a user walking down a street could see an advertisement that includes a phone number. The user can, using the teachings described herein, call the phone number by pointing a camera of a smartphone, for example, at the number to have the number entered into a phone application without manually entering the number. In one instance, the device could enter the number from the image and wait for a user direction to initiate the call or, in another instance, the call could be automatically placed by the device. This example can be extended to entering Web addresses or URLs in a web browser, email addresses for opening a new message window, physical addresses for opening a map application to display directions, and various other actionable data types.

Various other applications, processes and uses are presented below with respect to the various embodiments.

Figure 1A:
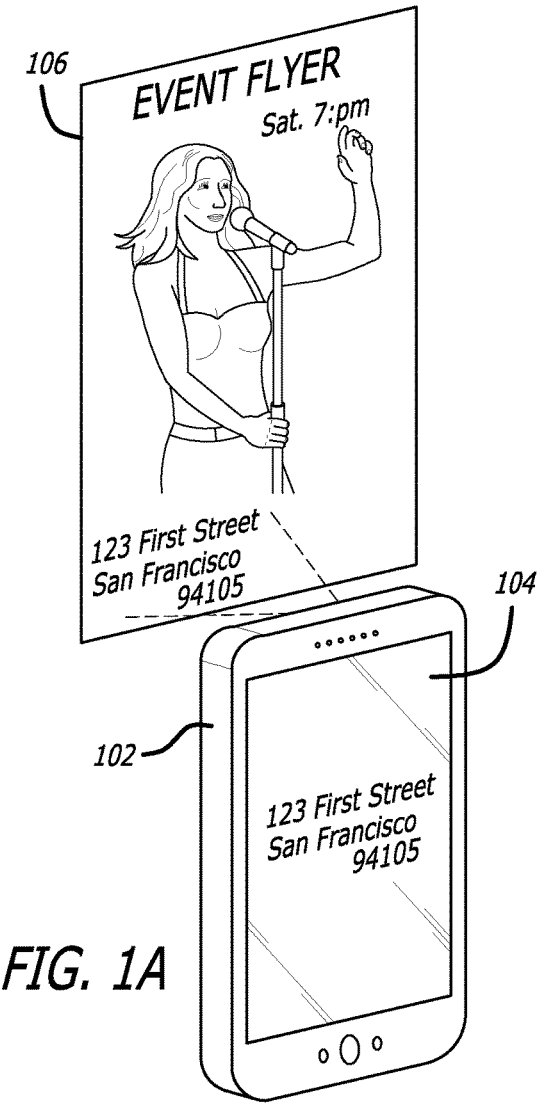
FIGS. 1A, 1B, and 1C illustrate an example implementation wherein a user holding a portable computing device provides text to a map application, in accordance with one embodiment.
Figure 1B:
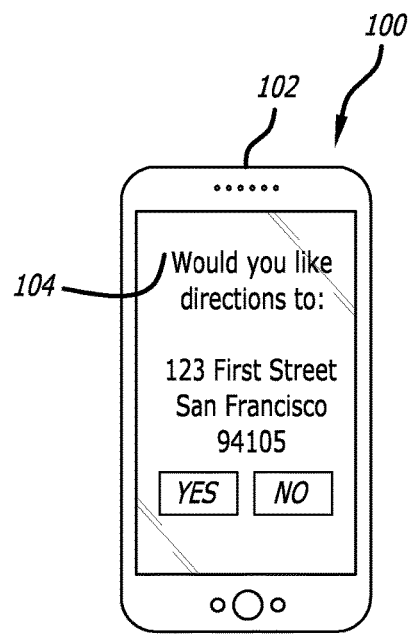
Figure 1C:
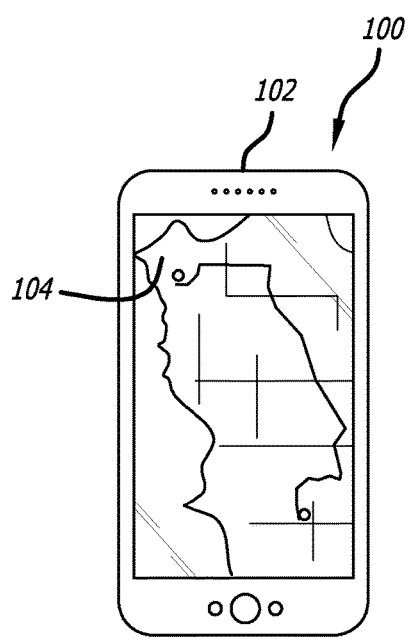

FIG. 1 illustrates example situation 100 showing a user holding a portable computing device 102 above an event flyer 106. The event flyer 106 contains a physical address of the event location and, in this example, the user is seeking directions to that location. In order to obtain directions, the user can point a camera of the device 102 at a portion of the flyer containing the address to capture or obtain an image of the address, as viewable though the screen 104 of FIG. 1A. In one embodiment, upon obtaining an image and/or identifying one or more portions of the image having properties that indicate the presence of text, an application on the device 102 automatically runs an optical character recognizing (OCR) algorithm to recognize the imaged text of the flyer. The OCR algorithm may, in various embodiments, include a machine vision algorithm and other image pre-processing algorithms making use of various techniques. The OCR algorithm runs to identify and analyze one or more regions of an image that may include strings of text or characters. Any identified strings are analyzed to further identify patterns that would indicate the presence of interested data objects or types, such as email addresses, URL/web addresses, phone numbers, and the like. Referring back to FIG. 1, a string indicating the presence of a physical address has been identified. In this example, a user is prompted, as shown in FIG. 1B, to confirm the user's intent to perform a specific action, or run a predetermined routine or workflow, associated with a physical address. In this example, the predetermined routine causes a map application to be opened and directions to the address displayed. In this example, the user can first confirm an intent by pressing a 'yes' button, or by making a selection on a touch screen, whereby a map with directions to the event are displayed on the screen 104 of the portable computing device 102 as shown in FIG. 1C. In another embodiment, the user can confirm intent by speaking to the device through a conversational interface, for example, by saying "yes" instead of pressing a button or making a selection on a touch screen. Other ways of confirming intent when prompted are also possible, such as by tilting the device and the like.

FIG. 2 illustrates an example situation 200 showing a user holding a portable computing device 202 above a business card 206, shown in FIG. 2A. As described above, the device 202, or service in communication with the device, locates text in a captured image of a business card, identifies the type or pattern of the text (e.g. an email address, phone number, URL etc.), determines a function or application (e.g. calling a number, opening an internet browser, etc.) associated with the type of text, and sends the application or function at least a relevant portion of the located text to perform an operation therewith. In this example, the business card 206 contains multiple data objects of interest, which are a phone number, an email, and a physical address. In one instance, a user could assign priorities to various functions or applications, in the event multiple data types are identified, for one data type to take priority of another. In another instance, the device 202 could prompt the user with a choice between, or among, various available functions or applications.

Referring back to FIG. 2, a device identifying two or more data objects could prompt the user with an option, as shown in FIG. 2B, to launch an address book application for saving the objects as contact information. Alternatively, the user could be prompted via the display 204 with a message such as "Press 1 to dial the number, 2 to find directions, 3 to email, or 4 to save contact." In one example, the text of the data types could be automatically populated into respective data field types. Further, in various embodiments, the device 202 could be programmed, preloaded, or include a downloadable plug-in to recognize objects like business cards and associate a default workflow therewith, which, in some instances, may be to save the data as a contact. In the example of FIG. 2, the user is prompted, as shown in FIG. 2B, to save the contact associated with the business card 206. In this case, however, the user wants to call the phone number on the business card and selects 'No.' In one instance, the device 202 could prompt the user again with individual options or the user could have set an application priority to automatically run a predetermined routine or execute a predetermined operation. Referring now to FIG. 2C, the user has either selected the option to call the phone number, or the user has assigned dialing a phone number as the priority operation, and the device 202 is shown calling the number.

FIG. 3 illustrates an example situation 300 showing a user pointing a portable computing device 302 toward a window 308. The window 308, in this example, has a web address printed thereon, shown in FIG. 3A. In accordance with various embodiments, a user walking down a street could point or aim a camera associated with device 302 at the web address as a shortcut to navigating thereto, instead of manually typing the address into a web browser. In this example, a user must select an icon 306 on the screen 304, or provide another such input, in order to manually capture the image of the window containing the web address. In the previous examples, the camera could have included a gyroscope, accelerometer, light sensor, or combination thereof, for example, to predict the user's intent to capture an image and initiate the routine, or execute the operation, associate with a particular data object. In this example, the user holds up the device 302, aims the camera at the window 308, and presses the icon 306 to capture the image of the web address. Then, as described above, the device or service runs the OCR algorithm to locate text in the image, identifies a type of, or pattern in, the text, which is a web address in this example, launches a browser application, and navigates the user to the web address of a restaurant, as shown in FIG. 3B. In some embodiments, various processes, algorithms, or other contextual clues can be utilized to confirm a user's intent. In the restaurant example, a system as described herein can utilize location data from a global positioning system (GPS) sensor to determine a user's location. Utilizing location data, the system can perform a web search of local businesses, for example, within a 100 ft of the user to confirm whether the user intended to be navigated to the web address initially determined by the system. In this example, if the user is standing in a location substantially near (or in front of) the Good Food Café, the system (or computing device) can determine with a fair degree of certainty that the user intended to be navigated to the Café's menu page or review page, for example. Various other processes, methods, or algorithms for confirming user intent to perform a function or launch an application are also possible.

Figure 4:
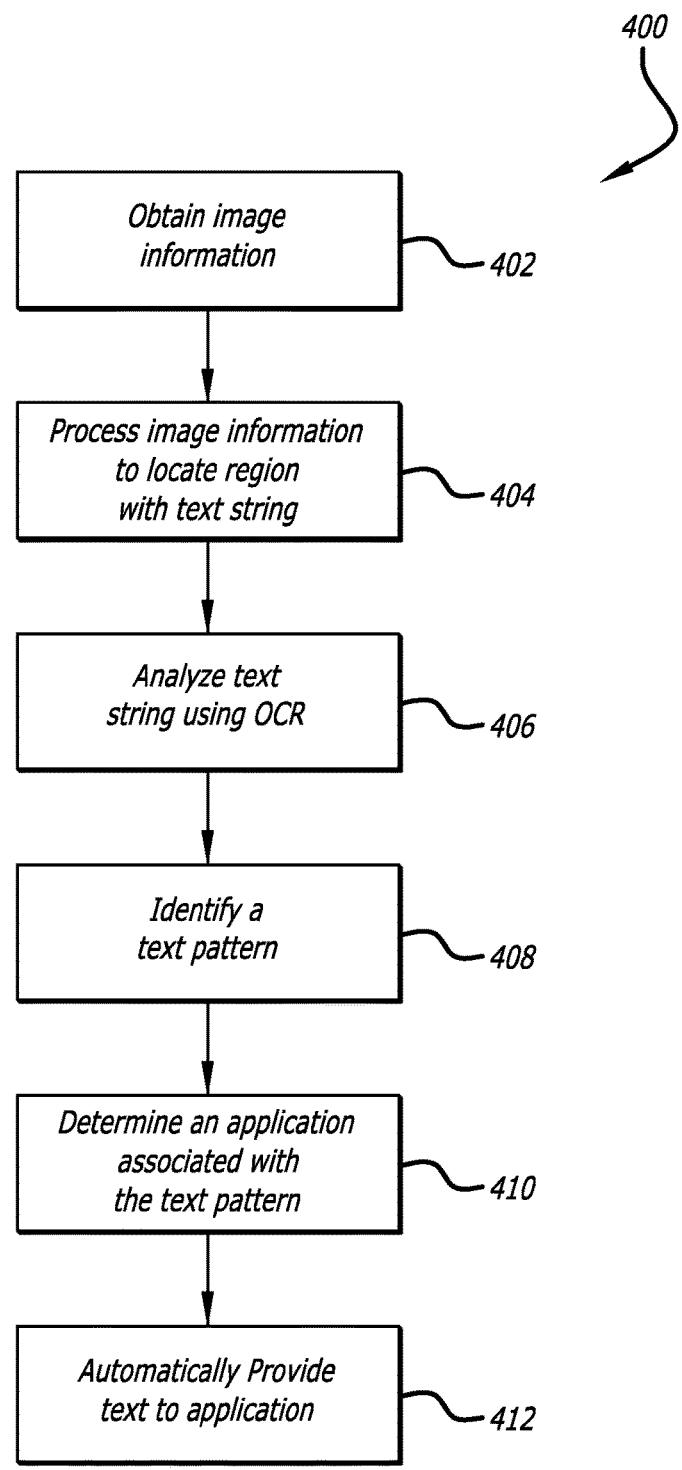
FIG. 4 illustrates an example process for providing text to an application on a portable computing device, in accordance with various embodiments.

FIG. 4 illustrates an example process 400 for providing textual information to an application or function on a computing device in accordance with various embodiments. It should be understood that, for any process discussed herein, there can be additional, fewer, or alternative steps performed in similar or alternative orders, or in parallel, within the scope of the various embodiments unless otherwise stated. In this example, an image or image information (e.g., a video stream) is obtained 402. In various embodiments, the image or image information is obtained from a camera application of the portable computing device. In one instance, hovering the device over an object facing the camera will cause the camera to automatically capture at least one image or record a sequence of images. In another instance, the camera requires input from a user in order to capture the image, such as by the user selecting an icon on a touch screen, for example. The obtained image information is processed to locate at least one region having properties of a string of text or characters 404. In one instance, the processing is automatically initiated upon receiving image information. The camera can also be in a continuous image capturing mode. This can, however, be energy intensive, so a user may select various options or circumstances in which to have the device continually run in an image capturing and processing mode or when to have it disabled. For example, a setting could be selected where the continuous capturing and processing mode is automatically turned off when the battery is drained to a particular level. In this example, the text string is analyzed using an optical character recognition algorithm to recognize text in the text string 406. The OCR algorithm can include a machine vision algorithm and other image preprocessing techniques or algorithms. A text pattern (e.g. an email, phone number, URL etc.) is identified that corresponds to the recognized text 408. In this example, an application associated with the text pattern determined 410 and the recognized text is automatically provided to the application.

In one embodiment, a device may not recognize a data object of interest within a portion of text. In this case, the device could be programmed to offer a user various other options such as performing a web search or to search for a plug-in to recognize a unrecognized pattern. The user could be prompted to select a portion of the text to copy/paste the text into an email, notepad, or various other applications.

In various embodiments, as described above with respect to FIG. 2, the function or application could involve dialing a number when the text pattern indicates a phone number or opening an address book for saving contact information when the text pattern indicates a presence of a phone number and a physical address. The application could be navigating to a URL when the text pattern indicates a web address as described in FIG. 3. The application could display a map to show an address when the text pattern indicates a physical address as described in FIG. 1. The function or application could also be performing various language translations. The application could also be a calculator, have the ability to solve math equations, or be associated with a plug-in for identifying features of a bill for calculating tips or splitting a bill multiple ways when eating at a restaurant with friends. In one embodiment, a user could be prompted to choose between a primary action and at least a secondary action associated with the particular data object. Referring back to the business card example, the predetermined primary action associated with the recognition of a business card could be to save the information thereon as a new contact in an address book application. A secondary action could be to call the phone number on the card, and a tertiary action could be to look up directions to the address.

In one embodiment, a system or service in communication with the portable computing device of many embodiments can monitor a user's activity over time to adjust an action performed by the application. For example, if a user always chooses to call a number on a business card and never chooses to save the contact, the device could adjust the algorithm to automatically call or prompt the user to call the number first. This example can also be extended to other data types. In other embodiments, the device could be preloaded with various behavior-predicting algorithms or intent-ware to predict a user's intent in various situations. For example, the device could include a user facing camera, gyroscope, accelerometer, light sensor, or combination thereof. The user facing camera could use facial recognition and gesture tracking algorithms to determine a user's gazing direction. A light sensor could determine the likely hood of being in a user's purse or pocket. In this example, the device may go into an energy saving mode and refrain from capturing or processing images until a sufficient amount of light is detected by the sensor. The gyroscope and accelerometer could be used to detect how the user is holding and moving the device. In some instances, a user makes a predictable motion or holds the device in a particular manner that is indicative of taking or capturing an image. In one example, a gyroscope and accelerometer registering movement may again place the device in an energy saving mode. In this example, capturing a decent image would be difficult and the device could be programmed to reasonably infer that these are not normal image capturing conditions. Various other methods or predicting a user intent may also be utilized within the scope of the present disclosure.

Various embodiments utilize image preprocessing algorithms and/or techniques to standardize text for identification and/or recognition. Text in the real world comes in many colors, shapes, font types that can be skewed, blurry, of different sizes, and the like. Machine vision image processing techniques can be utilized and which can include thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, and/or counting specific patterns). Various other techniques for processing text to be more easily recognizable by an OCR may also be utilized within the scope of this disclosure. In some embodiments, multiple images or a stream of video is analyzed to reduce glare or noise among other image imperfections.

FIG. 5 illustrates front and back views of an example portable computing device 500 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 500 has a display screen 502 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 510 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 504 on the "front" of the device and one image capture element 512 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 506 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 500 in this example also includes at least one motion- or position-determining element 508 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 514, such as may include at least one wired or wireless component operable to communicate with one or more portable computing devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

In order to provide functionality such as that described with respect to FIG. 5, FIG. 6 illustrates an example set of basic components of an portable computing device 600, such as the device 500 described with respect to FIG. 5. In this example, the device includes at least one processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc.

The device typically will include some type of display element 606, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 608, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 610, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one optical character recognizer (OCR) element(s) 612 and various image prepossessing algorithms associated therewith.

The device can include at least one additional input device that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 614 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 616 known in the art for providing power to an portable computing device, which can include capacitive charging elements for use with a power pad or similar device as discussed elsewhere herein. The example device also can include at least one touch- and/or pressure-sensitive element 618, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes. Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
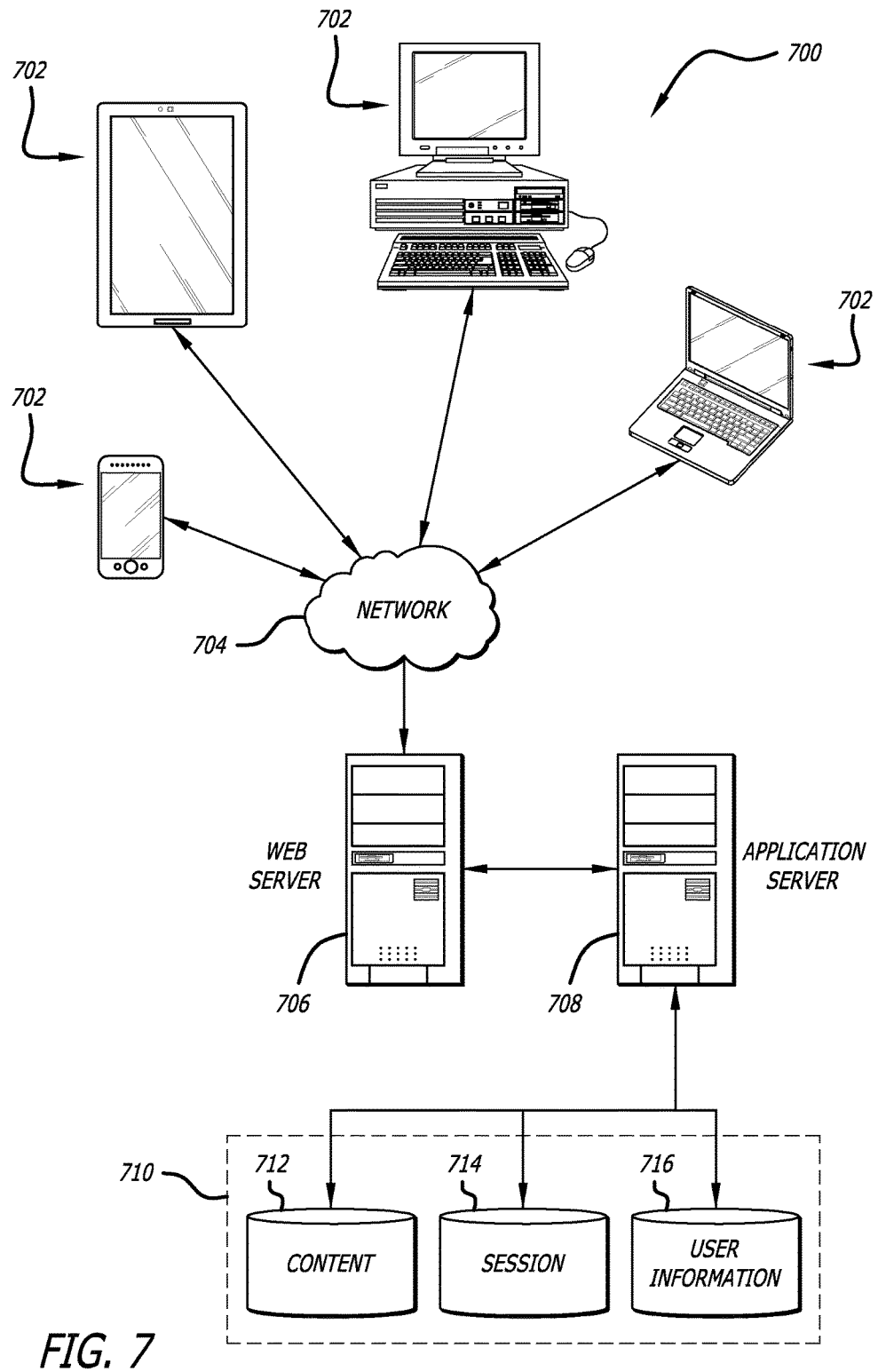
FIG. 7 illustrates an example environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   under control of one or more computer systems configured with executable instructions,
   obtaining image information captured by a camera of a portable computing device;
   processing the image information to locate at least one region having properties of a text string;
   analyzing the at least one region using an optical character recognition algorithm to recognize text in the at least one region;
   identifying a respective text type, of a plurality of text types, corresponding to the text;
   receiving, using a global position system, location data of the portable computing device;
   determining a first priority application associated with the respective text type, based at least in part on the respective text type, and the location data;
   determining a second priority application associated with the respective text type;
   monitoring user selections over time and in relation to the first priority application associated with the respective text type and the second priority application associated with the respective text type, to determine an indicator of user action associated with the respective text type;
   determining a user choice of the second priority application associated with the respective text type, based at least in part on the indicator of user action; and
   automatically providing the text to the second priority application.

2. The computer-implemented method of claim 1, wherein the processing, analyzing, identifying, determining, and providing occur automatically upon obtaining image information.

3. The computer-implemented method of claim 1, further comprising:
   causing the second priority application to perform at least one of dialing when the text type indicates a phone number, opening an email application for composing an email when the text type indicates an email, navigating to a URL when the text type indicates a web address, opening an address book for saving contact information when the text type indicates a presence of at least a phone number and an address, displaying a map to show an address when the text type indicates a physical address, performing language translation, or solving a math equation.

4. The computer-implemented method of claim 1, further comprising:
   confirming user intent to provide the text to the second priority application by sensing at least one of a movement of the device or orientation of the device using at least one of an accelerometer or gyroscope.

5. A computer-implemented method comprising:
   under control of one or more computer systems configured with executable instructions,
   identifying image information associated with text in an image;
   determining an identified text type, of a plurality of text types, from the image information;
   receiving, using a position system, location data of a computing device;
   determining a first priority function based at least on the identified text type, and the location data;
   determining a second priority function based at least on the identified text type;
   storing activity data representing user selections over time and in relation to the first priority function, the second priority function and the identified text type;
   determining, based at least in part on the activity data, an indicator of user action associated with the first priority function, the second priority function and the identified text type;
   determining a user choice of the second priority function, based at least in part on the indicator of user action; and
   enabling the computing device to perform the second priority function.

6. The computer-implemented method of claim 5, further comprising:
   prompting a user to confirm intent to perform the second priority function.

7. The computer-implemented method of claim 5, further comprising:
   prompting a user to choose between a primary action and at least a secondary action associated with the text type.

8. The computer-implemented method of claim 5, further comprising:
   obtaining the image, the image being obtained from a camera of the computing device.

9. The computer-implemented method of claim 8, further comprising:
   thresholding the image to standardized the image information associated with text to account for at least one of a blur, noise, or lighting variation of the image.

10. The computer-implemented method of claim 5, wherein the image is one of: obtained automatically when a camera of the computing device is focused on an object or obtained in response to a user input.

11. The computer-implemented method of claim 5, wherein the second priority function includes at least one of dialing when the text type indicates a phone number, opening an email application for composing an email when the text type indicates an email, navigating to a URL when the text type indicates a web address, opening an address book for saving contact information when the text type indicates a presence of at least a phone number and an address, displaying a map to show an address when the text type indicates a physical address, performing language translation, or solving a math equation.

12. The computer-implemented method of claim 5, wherein at least one of a computer vision algorithm or an optical character recognition algorithm are used to at least identify the image information associated with text in the image.

13. The computer-implemented method of claim 5, wherein at least one of the identifying the image information associated with text, determining the text type, or determining the indicator of user action is performed by a remote server in communication with the computing device.

14. A computer-implemented method comprising:
  under control of one or more computer systems configured with executable instructions,
  recognizing a string of characters from a digital image captured by a camera of a portable computing device;
  identifying a character pattern, of a plurality of character patterns, from the string of characters;
  identifying a particular text type, of a plurality of text types, associated with the character pattern;
  receiving, using a position system, location data of the portable computing device;
  determining a first priority application, based at least in part on the particular text type, and the location data;
  determining a second priority application based at least on the particular text type;
  storing activity data representing user selections over time and in relation to the first priority application, the second priority application and the particular text type;
  determining, based at least in part on the activity data, an indicator of user action associated with the first priority application, the second priority application and the particular text type;
  determining a user choice of the second priority application, based at least in part on the indicator of user action; and
  providing the character pattern to the second priority application.

15. The computer-implemented method of claim 14, wherein the second priority application when executed performs at least one of dialing when the character pattern indicates a phone number, navigating to a URL when the character pattern indicates a web address, opening an address book for saving contact information when the character pattern indicates a presence of at least a phone number and an address, displaying a map to show an address when the character pattern indicates a physical address, performing language translation, or solving a math equation.

16. The computer-implemented method of claim 14, further comprising:
  prompting a user to choose between a primary action and at least a secondary action associated with the character pattern.

17. A portable computing device, comprising:
  a processor; and
  a memory device including instructions that, when executed by the processor, cause the processor to:
  identify text in an image;
  identify a text pattern, of a plurality of text patterns, from the text;
  identify a particular text type, of a plurality of text types, associated with the text pattern;
  receive, using a position system, location data of the portable computing device;
  determine a first priority function, based at least in part on the particular text type, and the location data;
  determine a second priority function based at least on the particular text type;
  store activity data representing user selections over time and in relation to the first priority function, the second priority function and the particular text type;
  determine, based at least in part on the activity data, an indicator of user action associated with the first priority function, the second priority function and the particular text type;
  determine a user choice of the second priority function, based at least in part on the indicator of user action; and
  perform the second priority function.

18. The portable computing device of claim 17, wherein identifying the text, identifying the text pattern, determining the second priority function, and performing the second priority function are performed locally on the portable computing device.

19. The portable computing device of claim 17, wherein at least one of the identifying the text, identifying the text pattern, or determining the first priority function are performed by a remote server in communication with the portable computing device.

20. The portable computing device of claim 17, further comprising:
  a camera for obtaining the image automatically upon being focused on an object or in response to input from a user.

* * * * *